(12) United States Patent
Grant et al.

(10) Patent No.: US 8,333,819 B2
(45) Date of Patent: Dec. 18, 2012

(54) COMBINED BURNER AND LANCE APPARATUS FOR ELECTRIC ARC FURNACES

(75) Inventors: Michael G. K. Grant, Versailles (FR); Fabien Januard, Herblay (FR); Youssef Joumani, Paris (FR); Bernard Labegorre, Paris (FR); Jacky Laurent, Saint-Cyr l'Ecole (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 3 days.

(21) Appl. No.: 12/812,160

(22) PCT Filed: Jan. 6, 2009

(86) PCT No.: PCT/EP2009/050068
§ 371 (c)(1),
(2), (4) Date: Jul. 8, 2010

(87) PCT Pub. No.: WO2009/087142
PCT Pub. Date: Jul. 16, 2009

(65) Prior Publication Data
US 2010/0282021 A1    Nov. 11, 2010

(30) Foreign Application Priority Data
Jan. 8, 2008  (EP) .................... 08100201

(51) Int. Cl.
*C21C 5/48* (2006.01)
*C21C 7/072* (2006.01)
*C22B 9/05* (2006.01)

(52) U.S. Cl. .......................... 75/10.4; 266/44

(58) Field of Classification Search .................. 266/266, 266/221, 223, 225; 75/10.4
See application file for complete search history.

(56) References Cited

U.S. PATENT DOCUMENTS

| 6,229,838 B1 * | 5/2001 | Flichy et al. ..................... 373/60 |
| 6,514,310 B2 * | 2/2003 | Allemand et al. ............... 75/414 |
| 2001/0052200 A1 * | 12/2001 | Londero et al. .................... 48/92 |
| 2003/0000338 A1 | 1/2003 | Shver |
| 2003/0075843 A1 | 4/2003 | Wunsche |
| 2003/0218752 A1 | 11/2003 | Drasek et al. |
| 2009/0242414 A1 | 10/2009 | Wel-Biermann et al. |

FOREIGN PATENT DOCUMENTS

| DE | 1270059 | 6/1968 |
| DE | 19625537 | 4/1997 |
| EP | 0 964 065 | 12/1999 |
| WO | WO 02/33200 | 4/2002 |
| WO | WO 03/046522 | 6/2003 |
| WO | WO 03/060480 | 7/2003 |
| WO | WO 03/060491 | 7/2003 |

OTHER PUBLICATIONS

PCT/EP2009/050068 International Search Report, Apr. 21, 2009.
Grant, et al., "Efficiency of Oxygen Technologies in the EAF," AISE Electric Arc Furnace Conference Proceedings, 2000.

* cited by examiner

*Primary Examiner* — Roy King
*Assistant Examiner* — Tima M McGuthry Banks
(74) *Attorney, Agent, or Firm* — Christopher J. Cronin

(57) ABSTRACT

Process and apparatus for melting raw material in an electric arc furnace using a flame of variable direction, the apparatus comprising a burner and a lance whereby the lance outlet opening and the burner outlet opening are not concentric and are located at a distance from one another, and whereby the lance axis forms an angle with the burner axis in the range from 10° to 40.

12 Claims, 2 Drawing Sheets

COMBINED BURNER AND LANCE APPARATUS FOR ELECTRIC ARC FURNACES

CROSS-REFERENCE TO RELATED APPLICATIONS

This application is a §371 national stage application of International Application PCT/EP2009/050068, filed Jan. 6, 2009; which claims §119(a) foreign priority to European Patent Office application 08100201.6, filed Jan. 8, 2008.

BACKGROUND

1. Field of the Invention

The present invention relates to burners and lances for use in melting metals, such as ferrous materials in electric arc furnaces.

2. Related Art

The melting process in an electric arc furnace is a semi-batch process where cold raw metal, typically scrap metal, is loaded by means of a basket or bucket two to four times per melting process.

The electric arc melting processes and the advantages of oxygen use therein are discussed in the article "Efficiency of oxygen technologies in the EAF" by M. Grant and B. Allemand, and published in AISE Electric Arc Furnace Conference Proceedings, 2000.

The process for melting metal in an electric arc furnace (hereafter referred to as the "melting process") essentially comprises two steps:
 a melting step, and
 a refining step.

During the melting step, raw solid metal is loaded into the furnace and heat is supplied to the raw solid metal in the furnace so as to preheat and melt the metal. This heat is provided, on the one hand, via the electrodes or phases of the electric arc furnace and, on the other hand, by one or more burners mounted in the electric arc furnace, the flame of which is directed to the raw solid metal. When a new bucket- or basketload of raw metal is added to the electric arc furnace, the melting step is continued in order to melt the newly added raw metal.

Only a limited number of burners can be installed in an electric arc furnace, typically four per furnace shell.

In general, burners are installed:
 between phases on an AC (Alternating Current) furnace,
 near the slag door, and
 near the sump.

At the end of the melting step, when substantially all raw solid metal has melted, the molten metal is subjected to a refining step. During the refining step, the molten metal is refined so as to achieve the desired composition thereof. Typically, a supersonic jet of oxygen is used to penetrate the slag and decarburize the molten steel. The refining step usually also includes a foaming slag process in which oxygen and pulverized coal are injected together to produce foaming slag.

The use in new and revamped electrical arc furnaces of multi-function tools, combining a burner and a supersonic lance in a single apparatus, is gaining increasing acceptance.

In known multi-function tools the burner and the lance equipped with a convergent-divergent nozzle are combined in co-axial arrangement. Such known multi-function tools are commercialized by the applicant under the commercial denomination PyreJet™.

As with conventional, non-multi-function tool burners, the burner of the multi-function tool is used for preheating and melting the raw metal, in particular scrap, following the introduction of each bucketload of raw metal. The burner also makes it possible to avoid or eliminate cold areas in the furnace.

The main purpose of the lance is to create a supersonic flow so that the resulting focused oxygen jet is able to penetrate the slag and decarburize steel during refining. When the multi-function tool is further equipped with means to inject pulverized coal, the lance can also be used in combination with coal injection to create foamy slag during refining.

Although the use of known multi-function tools in electric arc furnaces have already led to a significant increase in energy efficiency of the electric arc furnace melting processes, there remains a need to achieve even higher energy efficiency by reliable means.

It has been shown that the best orientation for the supersonic nozzle/for the supersonic oxygen jet during refining in the electric arc furnace is in the range of about 40° to about 45° with respect to the molten bath, i.e. with respect to the horizontal plane.

The best inclination for the burner/for the burner flame during the melting step has been found to be usually about 20° with respect to the horizontal plane.

Consequently, in view of the co-axial arrangement between the burner and the lance in known multi-function tools a compromise between these two optimum ranges has been required. Usually, the optimum inclination of the supersonic nozzle/supersonic oxygen jet has been considered to take precedence over the optimum inclination of the burner/flame, and known multifunction tools are usually installed with an angle of about 45°.

Known multi-function tools therefore present the inconvenience that the burner is not installed according to its optimum inclination and that therefore heating efficiency of the multifunction tool during the melting step is impaired when compared to a conventional non-multi-function tool burner with the optimum burner inclination.

Furthermore, an important factor in melting processes in electric arc furnaces is the evolution of scrap or raw metal pile geometry during the melting step. As the melting proceeds, the level of the pile of raw solid metal decreases. On the other hand, when a new bucketload of raw metal is added to the electric arc furnace, the level of the pile of raw solid metal in the furnace suddenly increases.

As, in known multi-function tools, the burner has a fixed position and inclination, the position of the burner and the orientation of the burner and burner flame is again a compromise, without active response to the changes in the raw metal pile geometry, and again, the heating efficiency of the burner is thereby impaired.

From US-A-2003/0075843, it is known to actuate or pivot a multi-functional tool in an electric arc furnace by mechanical means. This approach is not durable in highly polluted environments such as occur in electric arc furnaces, because the moving parts are then subjected to severe mechanical and chemical attacks.

It is an object of the present invention further to increase the energy efficiency of melting processes in electric arc furnaces.

SUMMARY OF THE INVENTION

The present invention makes it possible further to increase the energy efficiency of such melting processes by providing an apparatus comprising a burner and a lance, which apparatus enables the direction of the flame produced by the burner to be deviated by fluid interaction with a gaseous jet produced by the lance.

The present invention also relates to a process for melting raw metal in an electric arc furnace equipped with an apparatus according to the invention, whereby, during at least part of the process the burner is used to combust fuel and oxidant and produce a flame in the electric arc furnace and whereby said flame is deviated by a jet of actuating gas injected into the electric arc furnace by the lance.

An increase in energy efficiency can thus be achieved for example, by changing the orientation of the flame produced by the burner during the melting process to take into account the evolution of the scrap or raw metal pile geometry during the melting process and/or by changing the orientation of the flame produced by the burner, in order better eliminate cold spots in the furnace.

BRIEF DESCRIPTION OF THE FIGURES

The present invention will be described in further detail hereafter, reference being made to FIGS. 1 to 3, whereby.

Figure 1:
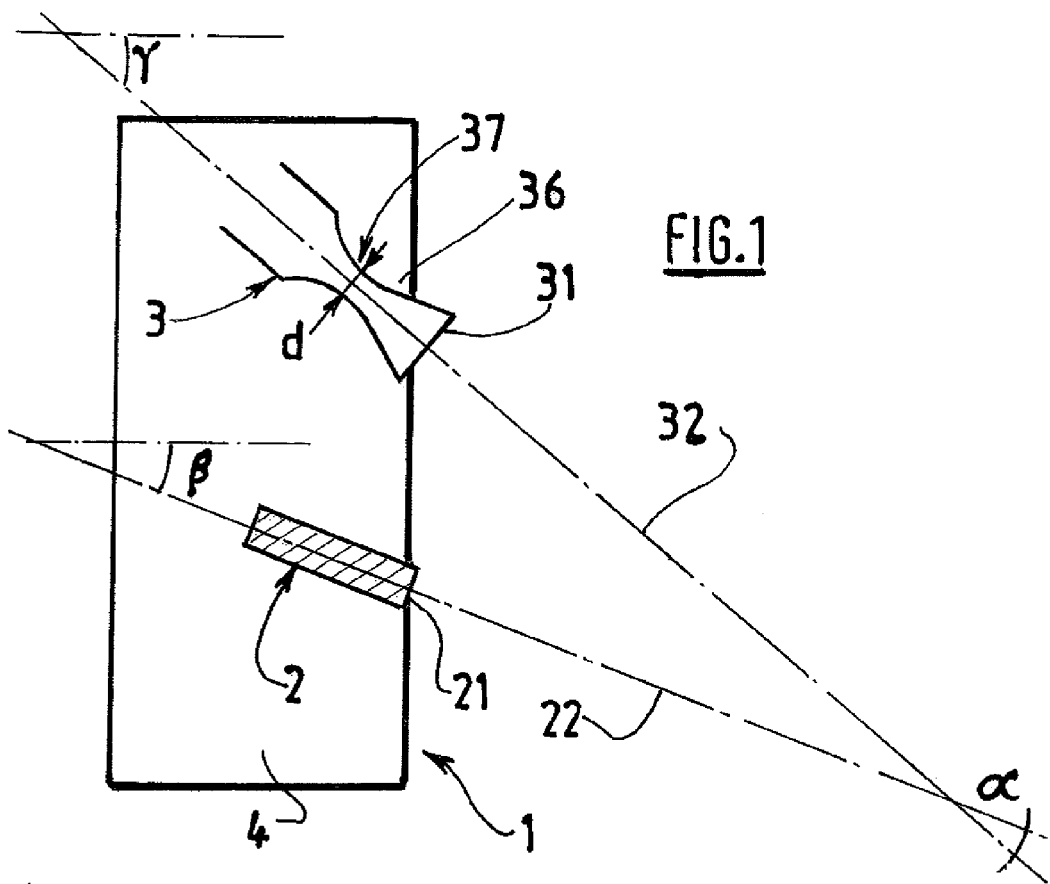
FIG. 1 is a schematic side view of a partial cross section of a first embodiment of the apparatus according to the invention mounted in the wall or shell of an electric arc furnace.
Figure 2:
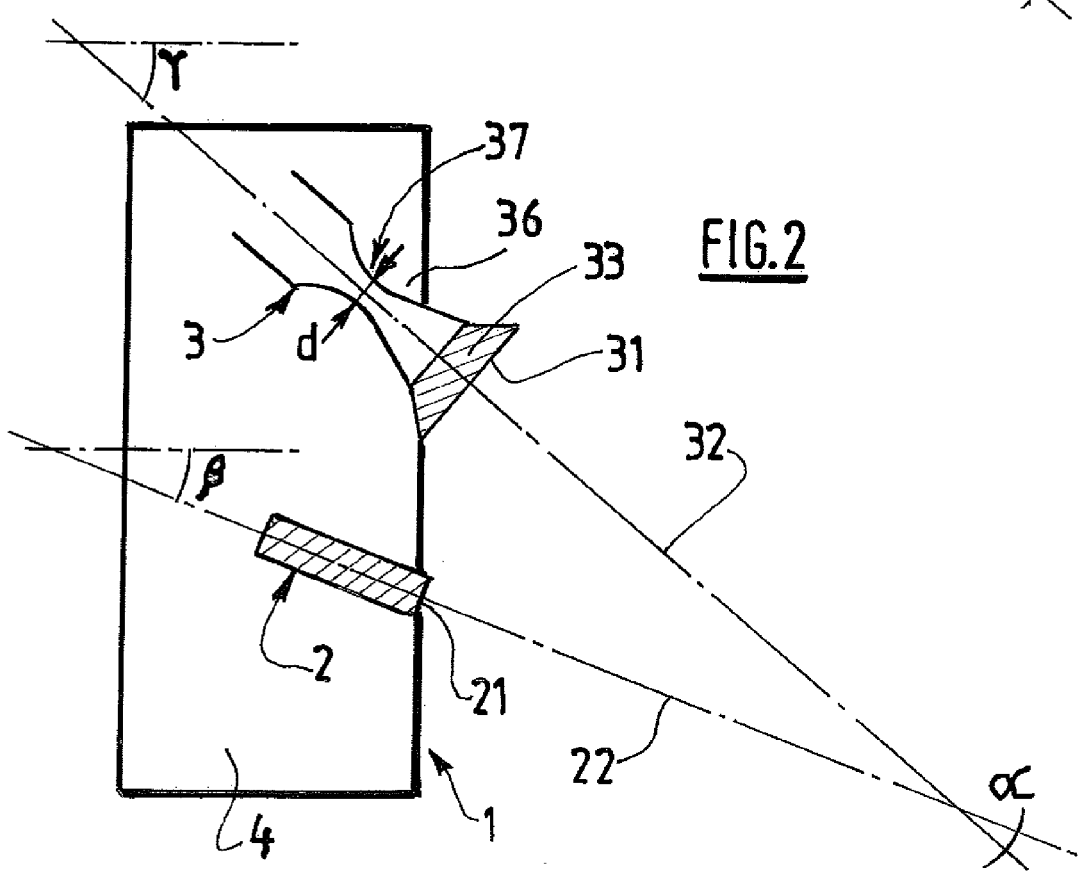
FIG. 2 is a schematic side view of a partial cross section of a second embodiment of the apparatus according to the invention mounted in the wall or shell of an electric arc furnace.

The present invention thus provides a new apparatus 1 for use in an electric arc furnace said apparatus comprising a burner 2 and a lance 3. The burner 2 has a burner outlet opening 21, which in use opens out into the electric arc furnace. The burner further defines a burner axis 22.

The lance 3 has a lance outlet 31 opening, which in use opens out into the electric arc furnace. The lance 3 also defines a lance axis 32. The lance is equipped with a convergent-divergent nozzle 36 with a sonic throat 37, also known as a Laval nozzle. Such convergent-divergent or Laval nozzles are designed to produce a supersonic or a subsonic gas jet depending on the upstream pressure: if the upstream pressure is higher than the nominal pressure of the nozzle design, the gas will leave the nozzle at supersonic velocity; if the upstream pressure is lower than the nominal pressure, the gas will leave the nozzle at subsonic velocity.

DETAILED DESCRIPTION OF THE INVENTION

According to the present invention, the lance outlet opening 31 and the burner outlet 21 opening are not concentric. They are instead located at a distance D from one another, said distance D being at most 20 times the lance diameter and preferably no more than 10 times the diameter d of the sonic throat 37.

The lance axis 32 forms an angle $\alpha$ with the burner axis 22, said angle $\alpha$ being in the range from 10° to 40° and preferably from 15° to 30°. The angle $\alpha$ can, for example, be approximately 25°.

In this manner, the apparatus enables the direction of a flame produced by the burner to be deviated by fluid interaction with a gaseous jet produced or injected by the lance.

According to a preferred embodiment of the invention, the lance 3 is equipped with a divergent nozzle 33 downstream of the convergent-divergent nozzle, so that, when the burner 2 and the lance 3 are operated simultaneously, the jet injected by the lance covers a wider area of the circumference of the flame produced by the burner than would be the case without said second divergent nozzle. A further option, which can be combined with the second divergent nozzle, is to equip the lance 3 with one or more auxiliary injectors 34 for injecting an auxiliary gas in the vicinity of the lance outlet opening 31. When during operation of the lance 3, such an auxiliary gas is injected through the one or more auxiliary injectors 34, the jet injected by the lance 3 is thereby broadened so that it covers a wider area of the circumference of the flame produced by the burner 2 than would be the case without injection of auxiliary gas. Such broadening of the jet injected by the lance makes it possible to provide more effective or efficient fluid interaction between the jet produced by the lance and the flame produced by the burner, and thereby a more effective or efficient deviation of the flame.

The apparatus preferably also comprises a water-cooled panel 4 in or through which the burner 2 and the lance 3 are mounted. In use in the furnace, the water-cooled panel provides cooling for the burner and the lance, thereby providing protection against deterioration due to overheating. Even though, according to a preferred embodiment of the apparatus according to the invention, the burner and the lance are mounted in a single water-cooled panel, the invention also covers embodiments of the apparatus whereby the lance and the burner are each mounted in separate water-cooled panels.

The apparatus typically also comprises a pulverized coal injector (not shown) suitable for use in foamy slag practice during refining. In that case, the pulverized coal injector is preferably also mounted in or through the water-cooled panel 4.

In use, the apparatus is mounted in an electric furnace, for example between phases in an AC electric arc furnace, near the slag door and/or near the sump.

The apparatus is preferably mounted in the electric arc furnace, so that the burner axis 22 forms an angle $\beta$ with the horizontal plane from 10° to 40°, preferably from 15° to 30°. The angle $\beta$ is the angle at which burner 2 injects its flame into the electric arc furnace when said flame is not being deviated by means of a jet produced by the lance 3.

The lance axis 32 preferably forms an angle $\gamma$ with the horizontal plane of from 30° to 60°, more preferably from 35° to 45°.

The lance outlet opening 31 is advantageously situated above the horizontal plane in which the burner outlet opening 21 is situated, and possibly directly above or substantially vertically above the burner outlet opening 21.

When the apparatus includes a pulverized coal injector, this pulverized coal injector preferably has a coal injector opening into the electric arc furnace which is situated below the horizontal plane in which the burner outlet opening 21 is situated and possibly directly below or substantially vertically below the burner outlet opening 21.

The present invention also covers electric arc furnaces equipped with one or more such apparatus.

The present invention also relates to a process for melting raw metal, typically raw ferrous metal, typically scrap metal, in an electric arc furnace provided or equipped with one or more using one or more apparatus of the invention.

The process of the invention comprises a melting step and a refining step. In this process, the burner 2 is used during at least part of the melting step to produce a flame 23 within the electric arc furnace. The lance 3 is used during at least part of the refining step to produce a supersonic jet. In accordance with the invention the lance 3 is used during at least part of the melting step to inject a jet 35 of an actuating gas into the electric arc furnace while the burner is producing a flame 23, thereby deviating the flame 23 produced by the burner 2 by fluid interaction between the flame 23 and the jet 35 of actuating gas.

Figure 3:
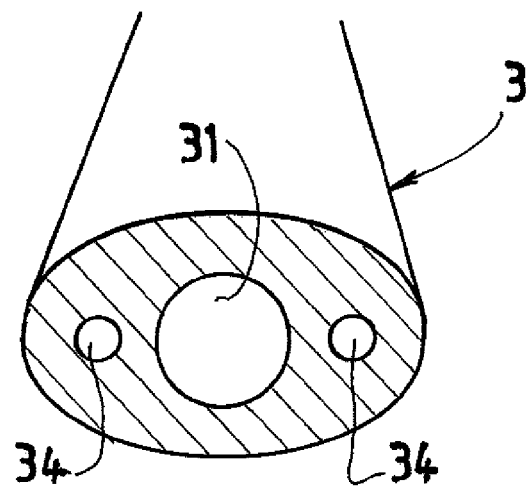
FIG. 3 is a partial schematic perspective view of a particular embodiment of a lance suitable for use in the apparatus.
Figure 4:
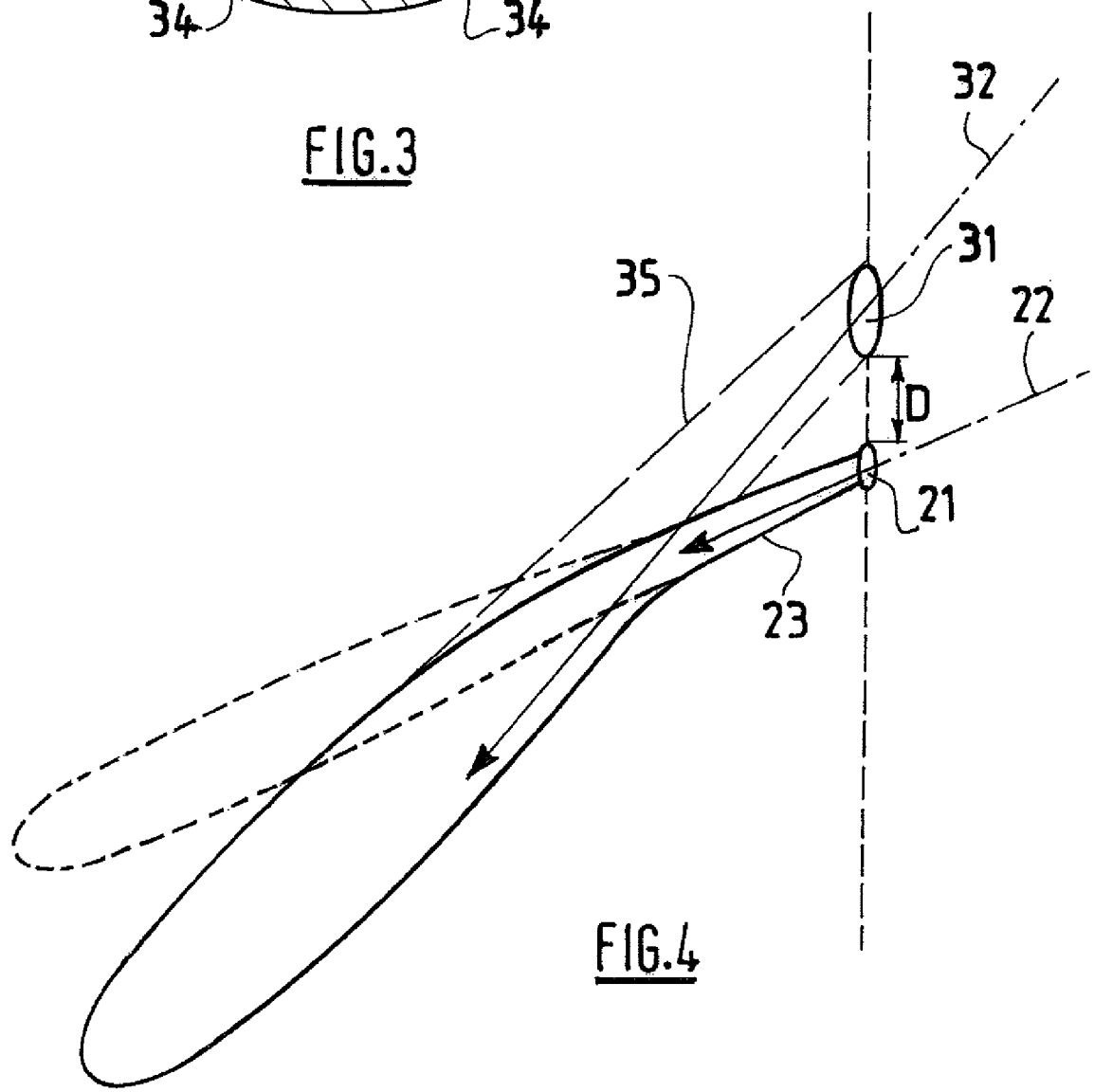
FIG. 4 is a schematic representation of the deviation of a flame produced by the burner by means of an actuating gas jet produced by the lance, in accordance with the process of the invention. In the embodiment illustrated in FIG. 4, the lance outlet opening is situated vertically above the burner outlet opening.

In the present context, the term "actuating gas jet" or "jet of actuating gas" 35 means the gas jet injected by the lance 3 at the same time as the burner 2 produces a flame 23 so that, as illustrated in FIG. 3, fluid interaction occurs between the gas jet and the flame, thereby deviating the flame from the direction it would have in the absence of the actuating gas jet (in FIG. 3, the flame that would be obtained in the absence of an actuating gas jet is shown in dotted lines).

It will be appreciated that an important advantage of the present invention is that it allows the orientation of the flame 23 produced by the burner 2 to be varied without the need for additional mechanical or moving parts which are exposed to the highly polluted and aggressive environment which exists inside the electric arc furnace. By making use of the lance 3 to vary the orientation of the flame, the present invention also does not require the installation of additional lances or injectors in the electric arc furnace in order to deviate the burner flame.

The burner 2 can advantageously be used at the beginning of the melting of a bucketload in order to preheat the raw metal.

The nominal power of the burner 2 preferably ranges between 2 and 6 MW.

According to an advantageous embodiment, the burner 2 is a gaseous fuel burner, for example for combusting natural gas. According to a further advantageous embodiment, the burner 2 is a liquid fuel burner, for example for combusting fuel oil.

In use, the burner 2 is equipped with a valve train for the supply of fuel on the one hand and oxidant on the other hand.

The lance 3 is likewise equipped with a valve train for the supply of gas.

When, using the process according to the invention, the orientation of the flame 23 produced by the burner 2 is varied by fluid interaction with a jet 35 of actuating gas so as to follow the changing raw metal pile geometry during the melting step, the transfer of heat towards the raw metal is improved and the time required for melting the raw metal can be shortened, thereby achieving improved energy efficiency.

For example, the flame 23 produced by the burner 2 can be lowered progressively as the pile of raw metal decreases during the melting step. The flame can similarly be raised when a new bucketload of raw metal is added, thereby creating a new or higher pile of raw metal.

It is a major advantage of the present invention that, by using the lance 3 to produce a jet 35 of actuating gas, it is possible to deviate the flame 23 produced by the burner 2 during the melting step by fluid interaction with the actuating gas jet and without requiring additional or more complex valve trains for the supply of fuel and gas when compared to existing multi-function tools.

The actuating gas jet 35 can, in particular, be an air jet or a nitrogen, an argon or an oxygen containing jet. An oxygen containing jet is preferred.

When the actuating gas jet is an air jet or more preferably an oxygen jet, it enables postcombustion of the CO released during the melting process, thereby further increasing the energy efficiency of the process.

When, as earlier described, the lance is equipped with a divergent nozzle 33 downstream of the convergent-divergent nozzle or if the lance is equipped with one or more auxiliary injectors 34 for injecting an auxiliary gas near the lance outlet opening 32 as described above, the actuating gas jet 35 is able to cover a more important area of the flame 23, thereby increasing the effect of the actuating gas jet on the flame and thus increasing the efficiency with which the actuating gas jet can vary the orientation of the flame.

During the refining step, the lance 3 can be used as a conventional lance tool.

In particular, the lance 3 can be used during the refining step to produce a supersonic oxygen jet with simultaneous injection of pulverized coal into the electric arc furnace by the pulverized coal injector, so as to produce foamy slag.

During refining, the lance 3 can also be used to produce a supersonic jet for mixing or agitating the molten metal. Said supersonic jet may be an air jet or an oxygen, an argon or a nitrogen containing jet or a jet containing a combination of nitrogen and argon. An oxygen containing jet is preferred.

When the lance 3 is used to produce a supersonic jet, the flow rate of said supersonic jet can usefully be between 800 and 4000 $Nm^3/h$, preferably between 1200 and 3000 $Nm^3/h$.

According to a specific embodiment of the present invention, the lance 3 can itself be equipped with means for varying the orientation of the gas jet which the lance injects into the electric arc furnace, i.e. of the actuating gas jet the lance injects during the melting step and/or of the supersonic jet the lance injects during the refining step Such means may, for example, means for providing an additional gas flow to impact the jet within the lance, i.e. upstream of the lance outlet opening 31, at the lance outlet opening 31 or immediately downstream of the lance outlet opening 31, thereby making it possible to change the orientation of the gas jet which is injected by the lance 3 into the electric arc furnace by fluid interaction with said additional gas flow. In particular, when the lance is equipped with one or more auxiliary injectors 34 for injecting an auxiliary gas in the vicinity of the lance outlet opening 31, the auxiliary gas can be used change the orientation of the gas jet injected by the lance.

The actuating gas jet 35 injected by the lance is preferably an oxygen containing jet. The jet of actuating gas 35 advantageously has an oxygen content of at least 25% by volume, preferably of at least 50% by volume and more preferably of at least 90% by volume.

Likewise, the supersonic jet injected by the lance is advantageously an oxygen containing jet having an oxygen content of at least 25% by volume, preferably of at least 50% by volume and more preferably of at least 90% by volume.

According to the invention, the electric arc furnace is typically also provided with a control installation for controlling:

during the melting step: the flow rates of fuel and oxidant to the burner and the flow rate of actuating gas to the lance, and during the refining step: the flow rate of gas to the lance.

When the lance is equipped with one or more auxiliary injectors 34 for injecting an auxiliary gas, the control installation normally also controls the flow rate of the auxiliary gas through the one or more auxiliary injectors.

When the apparatus is equipped with a pulverized coal injector, the control installation normally also controls the mass flow (rate) of pulverized coal to the pulverized coal injector during the refining step.

In particular, the electric arc furnace can be equipped with a control system for:

open loop control of the melting step based on burner stoichiometry control of the melting step and/or closed loop control of the melting step based on the raw metal pile geometry evolution, assessed for example in function of time lapsed or electric energy supplied via the electrodes since the beginning of the melting step, or by optical means, such as a laser.

As explained above, when the actuating gas jet 35 is an oxygen-containing gas, such as an air jet or more preferably an oxygen jet, the energy efficiency of the process can be further increased by the use of the oxygen-containing actuating gas jet 35 in the highly exothermic post-combustion of the CO released during the melting process to $CO_2$.

As the atmosphere in an electric arc furnace, and in particular the CO-content of said atmosphere can vary rapidly, the efficient use of post-combustion requires a rapidly responding control. If insufficient oxygen is injected into the furnace, post-combustion and the corresponding energy-saving will be incomplete as part of the CO released during the melting process will escape from the furnace in the flue gas. On the other hand, if too much oxygen is injected into the furnace, this will lead to oxidation of the graphite electrodes and to an increase of metal loss due to metal oxidation, both resulting in significant extra costs. Furthermore, the hot spots which occur when a significant excess of oxygen is injected into the furnace can accelerate the deterioration of the refractory material covering the inside of the furnace. Finally, injecting an excess of oxygen can also react with the molten metal bath and thereby affect the quality of the tapped molten metal.

The inventions thus also relates to a control installation which makes it possible to optimize the melting of the metal during the melting step:

by controlling the inclination of the flame produced by the burner during the melting process so as to optimize the heat transfer to the raw metal charge, or by controlling the overall flow rate of oxygen injected into the furnace so as to optimize the post-combustion, or preferably, by controlling both the inclination of the flame and the injection of oxygen.

The process according to the present invention is preferably conducted in an electric arc furnace equipped with such a control installation which controls the flow rates of fuel and oxidant to the burner and the flow rate of gas to the lance.

According to a first embodiment, the control installation comprises a device or clock which measures the time lapsed since the start of the melting process (beginning of heating of raw metal). According to a more preferred embodiment, the control installation comprises a device or meter which measures the amount of electric energy supplied (to the metal) via the electrodes or phases since the start of the melting step. The amount of energy supplied is typically expressed in kWh/ton raw metal loaded.

These two parameters, in particular the amount of energy supplied via the electrodes, are useful input parameters for the control of the melting process. Indeed, the time lapsed and in particular the energy supplied via the electrodes, make it possible to determine, for a given load of raw metal, (at least approximately) the end of the melting step and the beginning of the refining step, and can therefore, for example, be used as an input by the control installation to determine when to control the flow rate of gas to the lance so as to produce a supersonic jet for decarburization and/or when to control the flow rate of gas to the lance and the mass flow (rate) of pulverized coal to the pulverized coal injector so as to produce foamy slag in the furnace.

The time lapsed or the energy supplied via the electrodes, also make it possible, for a given load of raw metal, to determine the degree of progress of the melting step and the corresponding raw metal pile geometry, and can therefore, for example, be used as input by the control installation to control the flow rate of actuating gas to the lance and the flow rates of oxidant and of fuel to the burner so that, as the melting step progresses and the geometry of the raw material pile changes, the flame produced by the burner is maintained at an optimum inclination by fluid interaction between the flame and the actuating gas.

The control system may in particular comprise an operating system which receives the time lapsed since the start of the melting process or preferably the amount of electric energy supplied via the electrodes or phases since the start of the melting step as input, whereby said operating system, using software also referred to as a "model", determines the moment in time corresponding the end of the melting step and the beginning of the refining step and provides a corresponding signal as output and/or which determines the degree of progress of the melting step and/or an approximation of the raw pile geometry correlated to said degree of progress of the melting step and provides a corresponding signal as output.

The control installation preferably also comprises a CO-sensor for detecting the level of CO concentration in the furnace atmosphere, preferably for the real-time detection of the level of CO concentration in the furnace atmosphere. The CO-sensor may in particular detect the level of CO concentration in the furnace atmosphere by optical means, and in particular using a tunable diode laser, as is for example known from WO-A-0233200, WO-A-03046522, WO-A-03060480, WO-A-03060491, U.S. Pat. No. 2,003,218752, WO-A-2006061081.

Alternatively, the CO-sensor may detect the level of CO concentration in the furnace atmosphere indirectly by measuring the temperature of the fumes or flue gas at the elbow gap or slip gap of the furnace. Such an elbow gap or slip gap is usually present in the fumes extraction system of the electric arc furnace between the flue-gas elbow, mounted in the roof of the electric arc furnace, and the downstream, usually water-cooled, flue-gas duct downstream of said elbow. Through this gap, a certain amount ambient air can sucked with the fumes into the water-cooled duct. It is known from the article "Dynamic control of fossil fuel injections in EAF through continuous fumes monitoring" by Januard et al., published at the 2005 EEC conference in Birmingham, that the temperature at the elbow or slip gap is a measure for the concentration of CO leaving the furnace due to the combustion of the CO leaving the furnace with the air ingress at this point. Effective post-combustion within the furnace, leads to a reduction of CO leaving the furnace and consequently a lower fumes or flue gas temperature at the gap.

The control means may comprise both a CO-sensor for detecting the CO concentration by optical means and a CO-sensor for detecting the temperature of the fumes at the elbow gap or slip gap, whereby, for example, the CO-sensor for detecting the temperature of the fumes at the gap is as a back-up to verify the good functioning of the CO-sensor for detecting CO concentration by optical means.

The CO concentration in the furnace atmosphere or a parameter reflecting the CO concentration in the furnace atmosphere is a useful input parameter for the control of the melting process as it enables the control installation to control and optimize the post-combustion of CO to $CO_2$ in the furnace by controlling the flow rate of oxygen injected into the furnace by the lance and/or the burner in function of the detected level of CO concentration and the amount of fuel injected into the furnace by the burner, as only the amount of oxygen injected in excess of the amount of oxygen required for the combustion of the fuel contributes to the post combustion. The amount of oxygen required for the combustion of the fuel injected in the furnace is known as the stoichiometric amount.

According to a preferred embodiment of the process according to the invention, whereby the actuating gas is an oxygen containing gas, the control installation, during the melting step:

controls the flow rates of fuel and of oxidant to the burner and the flow rate of actuating gas to the lance so that, as the melting step proceeds and the geometry of the raw material pile changes, the flame produced by the burner is kept at an optimum inclination to the pile by fluid interaction with the actuating gas jet injected by the lance, and also optimizes post-combustion by regulating the amount of oxygen injected into the furnace by the burner as (part of) the oxidant and by the lance as (part of) the actuating gas, so that the amount of oxygen injected into the furnace by the burner and the lance in excess of the amount of oxygen required for the combustion of the fuel, is available for post-combustion.

The present invention thus provides a method for simultaneously controlling or regulating (a) the orientation of the flame of the burner (by means of fluid interaction with a jet of actuating gas injected by the lance) and (b) the post combustion in the furnace by controlling the amount of oxygen injected respectively by the burner and by the lance, or by controlling the amount of fuel injected by the burner and the amount of oxygen injected respectively by the burner and the lance.

The control installation may also comprise a $CO_2$-sensor for detecting the level of $CO_2$ in the furnace atmosphere, preferably by real-time detection of the level of $CO_2$ in the furnace atmosphere, for example using optical means such as a tunable diode laser. Using the level of $CO_2$ in the furnace atmosphere detected by the $CO_2$-sensor as input, the control installation can monitor the good functioning of the post combustion in the furnace. The control installation may in particular comprise a sensor which detects both the level of CO and of $CO_2$ in the furnace atmosphere, for example using optical means such as a tunable diode laser.

The control installation may further be comprise a heat-sensor for detecting overheating of the water-cooled panels of the electric arc furnace. In that case, the heat-sensor can detect overheating of the lining by detecting when the temperature of the cooling water of one or more panels, and in particular of the panel or panels in which the burner and the lance are mounted, exceeds a predetermined value which is characteristic of overheating. If the heat-sensor detects overheating of one or more water-cooled panels, this information can be used by the control installation as a signal to reduce the amount of oxygen and/or fuel injected into the furnace so as to reduce the heat released into the furnace by combustion and/or post combustion.

The control installation advantageously also ensures that, during the melting process:

the flow rate of oxidant and/or fuel to the burner remains above a minimum or pilot burner flow rate, and the flow rate of gas to the lance remains above a minimum or pilot lance flow rate, in order to protect the burner against deposition of pollutants, slag or metal.

The following is a non-limiting example of the melting process according to the invention.

At the beginning of a melting step:

the burner of the apparatus is rapidly switched from its low power pilot or inactive mode to its nominal power burner mode with a power between 2 and 6 MW, meanwhile, the lance is maintained in pilot mode or, as the case may be, the lance is used to inject a low level actuating flow to keep flame near optimal configuration (about 20°). When the actuating flow is an oxygen flow, the oxygen acts as complementary oxygen to flame stoichiometry and/or as additional oxygen for post combustion. These flow rates can be controlled by the control installation on the basis of off-gas analysis device for example.

In view of the highly polluted and aggressive atmosphere within an electric arc furnace, burners and injectors mounted in the electric arc furnace are as a rule not totally switched off during a melting process. Even when a burner is not being used to produce a flame for transferring heat to the raw metal charge (i.e. when the burner is not in operation), the burner is maintained in pilot or holding or hold fire mode, during which the burner is supplied with a limited and controlled flow of fuel and/or oxidant, also described as the predetermined minimum burner flow rate, so as to protect the burner, in particular against the deposition of pollutants or slag or metal splashing onto the burner which could block the burner or otherwise hamper its good functioning. Likewise, even when during the refining step, a lance is not being used to inject a supersonic gas flow, in particular for decarburization or for producing foamy slag, or when, during the melting step, in accordance with the present invention a lance is not used to inject an actuating flow, the lance is maintained in pilot or holding mode during which it is supplied with a limited and controlled flow of gas, also described as the predetermined minimum lance flow rate, so as to protect the lance.

As the melting step progresses:

the burner is maintained at its nominal power burner mode and the actuating flow is progressively increased in order to deviate the flame and keep the angle of the flame with respect to the horizontal as optimal as possible in view of the collapse of the scrap pile: for example from 20° up to 45°. Again, the actuating flow acts as complementary oxygen to flame stoichiometry (possibly accompanied with a reduction in the fuel flow rate to the burner) and/or as additional oxygen used for post combustion. These flow rates can for example be controlled in function of an analysis of the furnace atmosphere, and in particular in function of the CO content of said atmosphere.

The angle θ of the resulting flame with respect to the horizontal varies in particular in function of the mass flow rates of fuel and oxidant from the burner and of the mass flow rate of actuating gas from the lance. In the case of gaseous fuel:

$$\theta = f\left(\frac{\dot{m}_{actuating\ gas\ jet}}{\dot{m}_{fuel} + \dot{m}_{oxidant}}\right)$$

whereby m is the mass flow rate of the gas concerned.

When $\dot{m}_{actuating\ gas\ jet}=0$, θ is the angle of the undeviated flame with respect to the horizontal, normally corresponding to the angle β of the burner axis with the horizontal plane.

During the refining step:

the burner is returned to its pilot or inactive mode, and the nozzle is switched to supersonic mode so as to inject a supersonic oxygen jet into the electric arc furnace and the pulverized coal injector, which was kept in inactive mode during the melting step, is used to inject pulverized coal into the electric arc furnace. The supersonic oxygen and coal injection are controlled so as to produce foamy slag. For optimum efficiency of the foamy slag process, the supersonic oxygen and coal injection are controlled by a control system using a closed loop control based on sensors for off gas analysis, measurement of electrical parameters or any equivalent sensor described in state of art.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for melting metal in an electric arc furnace having an apparatus operably connected to the electric arc furnace, the apparatus comprising:
   a burner for burning fuel and an oxidant, said burner having a burner axis and a burner outlet opening, and
   a lance having a lance axis and a lance outlet opening, the lance being equipped with a convergent-divergent nozzle comprising a sonic throat having a diameter d, wherein the lance outlet opening and the burner outlet opening are not concentric and are located at a distance D from one another, D 20×d, and the lance axis forms an angle α with the burner axis in the range from 10° to 40°, the process comprising the steps of:
   during a metal melting step, operating the burner of the apparatus to combust fuel and oxidant to produce a flame within the electric arc furnace, and deviating the flame by injecting a jet of an actuating gas from the lance of the burner of the apparatus into the electric arc furnace; and
   during a step of refining the metal, switching the lance to supersonic mode so as to inject a supersonic jet of oxygen into the electric arc furnace.

2. The process of claim 1, whereby the metal comprises a ferrous raw metal.

3. The process of claim 1, wherein the jet of actuating gas has an oxygen content of at least 25% by volume.

4. The process of claim 1, wherein the jet of actuating gas has an oxygen content of at least 50% by volume.

5. The process of claim 4, wherein the jet of actuating gas has an oxygen content of at least 90% by volume.

6. The process of claim 1, wherein the electric arc furnace is further equipped with a control installation which controls flow rates of the fuel and oxidant to the burner and a flow rate of gas to the lance.

7. The process of claim 6, wherein the actuating gas is an oxygen containing gas and wherein, during the melting step, the control installation controls the amount of oxygen injected into the furnace by the burner and by the lance.

8. The process of claim 1, wherein the burner axis forms an angle β with a horizontal plane from 10° to 40°.

9. The process of claim 1, wherein the burner axis forms an angle β with a horizontal plane from 15° to 30°.

10. The process of claim 1, wherein the lance axis forms an angle γ with a horizontal plane from 30° to 60°.

11. The process of claim 1, wherein the lance axis forms an angle γ with a horizontal plane from 35° to 45°.

12. A process for melting metal in an electric arc furnace having an apparatus operably connected to the electric arc furnace, the apparatus comprising:
   a burner for burning fuel and an oxidant, said burner having a burner axis and a burner outlet opening, and
   a lance having a lance axis and a lance outlet opening, the lance being equipped with a convergent-divergent nozzle comprising a sonic throat having a diameter d, wherein the lance outlet opening and the burner outlet opening are not concentric and are located at a distance D from one another, D 20×d, and the lance axis forms an angle α with the burner axis in the range from 10° to 40°, the process comprising the steps of:
   a) a step of melting the metal, the step of melting comprising a sub-step of operating the burner of the apparatus to combust fuel and oxidant to produce a flame within the electric arc furnace and
   b) a step of refining the metal, during said step of refining, initiating supersonic operation of the lance of the apparatus in a supersonic mode so as to inject a supersonic jet of oxygen into the electric arc furnace, and wherein during at least part of the step of melting the metal, the lance is operated to inject a jet of an actuating gas into the electric arc furnace while the burner is operated to combust fuel and oxidant and produce a flame, whereby the jet of actuating gas deviates the flame produced by the burner, wherein the actuating gas is an oxygen containing gas and wherein, during the melting step, a control installation controls the flow rates of fuel and of oxidant to the burner and the flow rate of actuating gas to the lance so that the flame produced by the burner is, by fluid interaction between the flame and the actuating gas jet injected by the lance, kept at an optimum inclination for heat transfer to the metal.

* * * * *